Nov. 26, 1974 W. O. DALTON 3,851,014
METHOD FOR MAKING RUBBER MODIFIED RESINS
Filed Oct. 1, 1973 3 Sheets-Sheet 2
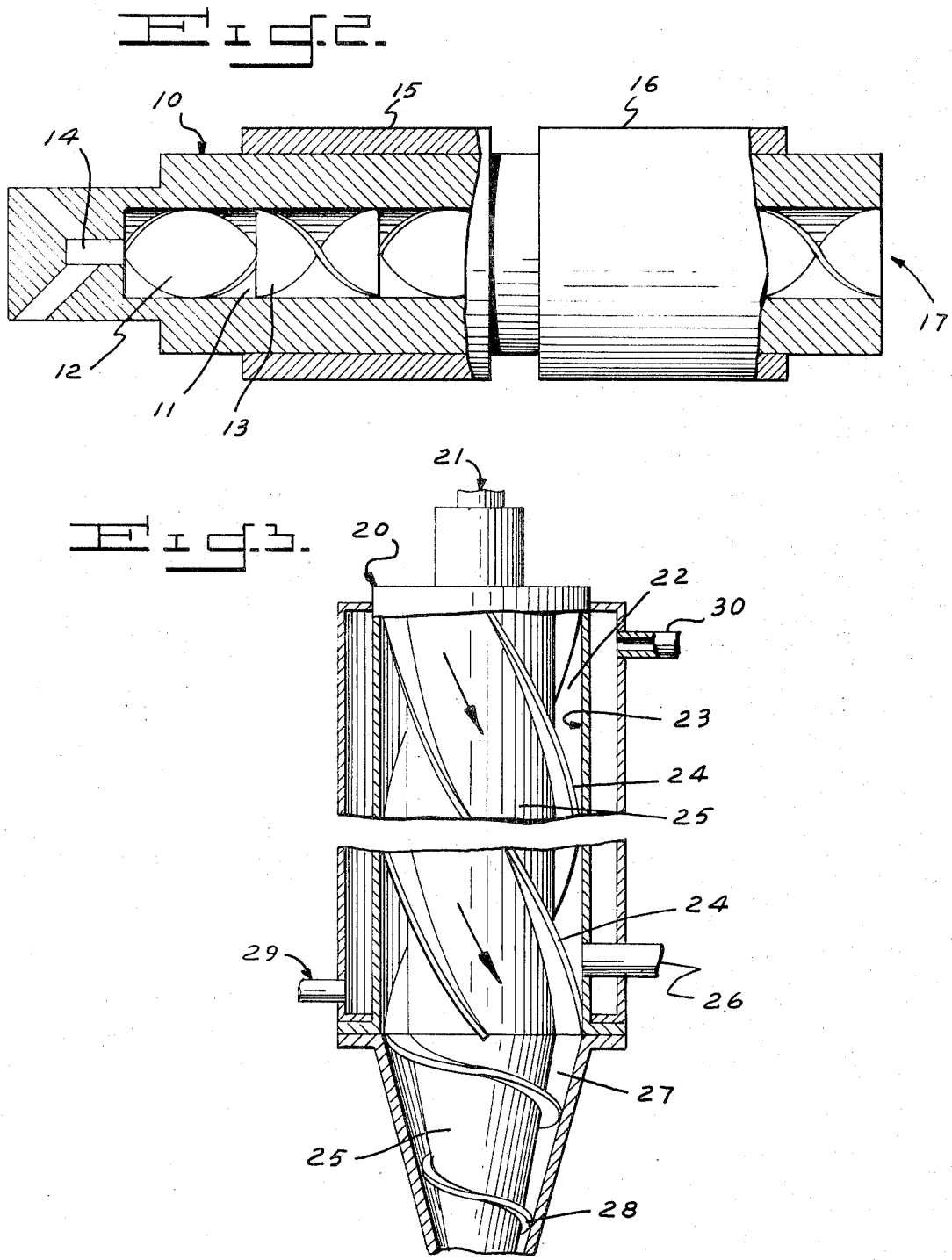

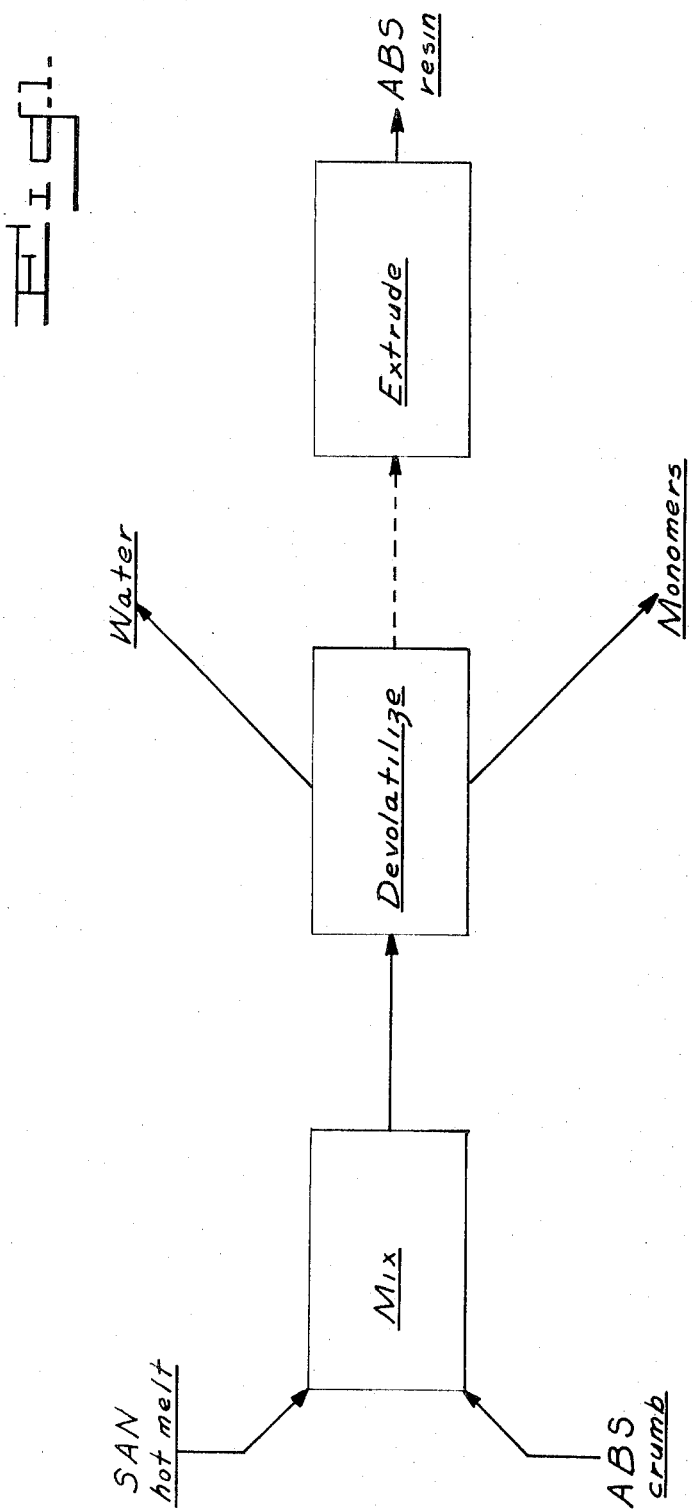

United States Patent Office 3,851,014
Patented Nov. 26, 1974

3,851,014
METHOD FOR MAKING RUBBER
MODIFIED RESINS
William O. Dalton, Hampden, Mass., assignor to
Monsanto Company, St. Louis, Mo.
Continuation-in-part of abandoned application Ser. No.
322,245, Jan. 9, 1973. This application Oct. 1, 1973,
Ser. No. 402,235
Int. Cl. C08f 41/12
U.S. Cl. 260—876 R
9 Claims

ABSTRACT OF THE DISCLOSURE

A process for making rubber modified resins by mixing a hot melt of styrene/acrylonitrile type copolymer with a dispersion in organic liquid of preformed rubber particles of alkadiene rubber grafted with styrene and acrylonitrile type monomers and then devolatilizing to produce a hot melt of such styrene/acrylonitrile copolymer having distributed therethrough such preformed grafted rubber particles. The process permits rapid, in-line changeover from one specific ABS-type resin to another in a continuous manufacturing operation with little production of off-grade material.

BACKGROUND

This application is a continuation-in-part of applicant's copending application Ser. No. 322,245, filed Jan. 9, 1973, and now abandoned.

In the commercial production of rubber modified resins of the type wherein rubber particles of alkadiene rubber grafted with styrene-type monomer and acrylonitrile-type monomer are generally uniformly dispersed in a matrix of a copolymer of styrene-type monomer and acrylonitrile-type monomer, such resins sometimes being termed ABS-type resins, it has heretofore been a common commercial practice to use either suspension or emulsion polymerization procedures for the preparation thereof. A given product resin is produced either as a result of a single batch polymerization or as a result of several batch polymerization followed by a physical blending procedure involving mixing of preformed graft copolymers with other such graft copolymers or with ungrafted copolymer. Because of the inherent cost, complexity and sensitivity associated with such manufactured technology, the art has recently been attempting to develop different techniques which would permit one to manufacture such resins using cheaper, less complex, highly reliable procedures and equipment. A particularly promising different technique would involve the use of mass polymerization which avoids such problems as product separation and recovery from the water used for suspension or emulsion polymerization.

To prepare ABS-type resins by all-mass polymerization technology has been heretofore proposed, but the practical realization of such a synthetic route on a commercial scale is full of problems because of the difficulties of producing a product resin which is cheap enough to be competitive and still have the necessary and desirable physical product resin properties for molding and extruding and for formed, manufactured product applications. Because of these difficulties, the art would like to blend some of the mass polymerization with some of the emulsion and/or suspension technology to make a sort of hybrid process. So far as is presently known to me, however, the previously proposed hybrid routes involving such a mixture of polymerization technologies to make ABS-type resins have generally not been commercializable for a variety of cost/product quality related reasons.

I have now invented a new and very useful process suitable for making ABS-type and other related such resins which utilizes both mass-polymerization technology and emulsion, or even suspension, technology. My process involves mixing together and then devolatilizing a hot melt composition containing a preformed styrene/acrylonitrile copolymer, which is conveniently made by mass polymerization, with a relatively concentrated organic liquid phase dispersion of preformed graft polymerized alkadiene elastomer, which may be made, if desired, by emulsion polymerization followed by phase transfer. This new process is relatively simple, utilizes relatively economical techniques, and has a variety of advantages. Thus, for one thing, my process gives one the possibility for rapid, in line change-over from one product resin grade to another in a continuous manufacturing operation without equipment shut down and while producing only a very small amount of off grade material. For another thing, this new process overcomes simultaneously both the lubricity problems associated with the mixing of hot melts of the styrene/acrylonitrile copolymer type and the dispersion problems associated with the mixing of preformed ABS-type graft polymer particles. For still another thing, my process enables one to produce a resin product which has excellent physical properties. For yet another thing, my process permits recovery of volatiles evolved with consequent minimum material wastage and pollution problems. Other and further advantages and objects will be apparent to those skilled in the art from examination of the present specification and drawings.

SUMMARY

The present invention is adapted for utilization as part of a manufacturing process for making resins of the type where rubber particles of alkadiene rubber grafted with monovinylidene aromatic monomer and alkene nitrile monomer are generally uniformly dispersed in a matrix copolymer of monovinylidene aromatic monomer and alkene nitrile monomer. In the practice of this invention one utilizes two steps which either may be practiced sequentially (presently preferred) or generally simultaneously. These steps involve the admixing together and the placing in a flash vaporization zone of a first composition and a second composition. The mixture of such first and such second composition comprises on a 100 weight percent total mixture basis from about 50 to 90 weight percent of such first composition and from about 50 to 10 weight percent of such second composition.

The first composition comprises from about 40 to 80 weight percent on a total first composition basis of a first copolymer of monovinylidene aromatic monomer and alkene nitrile monomer. This copolymer has a weight average molecular weight of from about 75,000 to 500,000. The balance up to 100 weight percent of such first composition comprises monomers selected from the group consisting of monovinylidene aromatic monomer and alkene nitrile monomer. In this first composition the respective weight ratio of monovinylidene aromatic monomer to alkene nitrile monomer in said first copolymer and also in said monomers ranges from about 90:10 to 10:90. This first composition is initially in the physical form of a homogeneous hot melt and has an initial temperature of from about 130 to 180° C.

The second composition comprises on a total 100 weight percent second composition basis from about 30 to 70 weight percent of graft copolymer, from about 0.01 to 50 weight percent of second copolymer of monovinylidene aromatic monomer and alkene nitrile monomer having a weight average molecular weight of from about 50,000 to 500,000, from about 70 to 30 weight percent of an organic liquid having a boiling point in the range of from about 25 to 150° C. at atmospheric pressure and further being characterized by being substantially non-chemically reactive with said graft copolymer and by causing said graft copolymer to swell by not more than about 25% by volume, and from about 0 to 15 weight percent of water.

The graft copolymer has a substrate of an alkadiene elastomer whose glass phase transition temperature is below about —20° C. The superstrate of this polymer is composed of monovinylidene aromatic monomer and alkene nitrile monomer. This graft copolymer has a graft ratio of from about 5 to 75 parts by weight superstrate for each 100 parts by weight of substrate and a weight average particle size distribution in the range of from about 0.25 to 2.0 microns.

The weight ratio of monovinylidene aromatic monomer to alkene nitrile monomer in the second copolymer and also in the graft copolymer superstrate ranges from about 90:10 to 10:90.

The second composition is initially in the physical form of a dispersion of said graft copolymer in said organic liquid, and has an initial temperature ranging from about 0° C. up to the boiling point of the indicated organic liquid.

The admixing together of the first composition and the second composition is accomplished while maintaining a temperature of from about 120 to 180° C. The placing of the admixed first and second compositions into a flash vaporization zone is generally carried out over a total time interval of less than about 10 minutes. In such zone, the admixed compositions are devolatilized. The flash vaporization zone is at a pressure of from about .001 to 800 mm. Hg absolute and at a temperature in the range of from about 120 to 280° C., and preferably, 2 to 200 mm. Hg abs. and 180 to 250° C.

Simultaneously with such placing, the admixture of first and second composition is maintained in a physical form such that, for a period of time of at least about 1 minute in said flash vaporization zone, such admixture in said zone has a ratio of total surface area to total volume thereof at any given time of at least about 2.5:1, and preferably, from about 5:1 to 30:1. In addition, and simultaneously, vapors evolved from such admixture of the first and the second composition are removed from the zone. Preferably the removal rate of evolved vapors is at least about equal to the rate at which the vapors are so generated.

The combination of the aforeindicated conditions in the flash vaporization zone is such that the devolatilized composition thereafter removed from the zone comprises at least about 97 weight percent on a total devolatilized composition basis of polymeric solids derived from both the combined first and second copolymers of monovinylidene aromatic monomer and alkene nitrile monomer as well as the graft copolymer intermixed therewith.

Preferably, the process of this invention uses as the monovinylidene aromatic monomer starting material styrene, and, also preferably, the alkene nitrile comprises acrylonitrile.

When the present invention is being practiced with styrene and acrylonitrile as starting monomers, the admixing is preferably accomplished using temperatures maintained in the range of from about 120 to 180° C. The first composition then comprises from about 50 to 90 weight percent while the second composition correspondingly comprises from about 50 to 10 weight percent thereof, on a total 100 weight percent mixture basis.

In such preferred form, the first composition comprises in the practice of this invention from about 55 to 70 weight percent on a total first composition basis of styrene/acrylonitrile first copolymer having a weight average molecular weight of from about 75,000 to 300,000. The balance up to 100 weight percent of the first composition is a mixture of styrene monomer and acrylonitrile monomer. The respective weight ratio of styrene to acrylonitrile in the first copolymer and also in the monomer mixture ranges from about 75:25 to 50:50. The homogeneous hot melt has an initial temperature of from about 140 to 170°.

The second composition comprises from about 50 to 10 weight percent on a total second composition basis of the said graft copolymer, from about 0.01 to 25 weight percent of styrene/acrylonitrile second copolymer having a weight average molecular weight of from about 75,000 to 300,000, from about 65 to 40 percent weight percent of said organic liquid having a boiling point in a range of from about 50 to 100° C. at atmospheric pressure and further being characterized by causing substantially no swelling of the indicated graft copolymer, and from about 0 to 10 weight percent water, all weight percents being on a total second composition basis, during the practice of such a preferred form of this invention. In such preferred form, the graft copolymer has a substrate of an elastomer comprising at about 85 weight percent butadiene with a balance up to 100 weight percent thereof being a comonomer selected from the group consisting of styrene and acrylonitrile. Such a preferred graft copolymer has a superstrate of styrene and acrylonitrile and a graft ratio of from about 10 to 50 parts by weight superstrate for each 100 parts by weight of substrate. The graft copolymer here has a weight average particle size distribution in the range of from about 0.3 to 0.8 microns. In this preferred second composition, the respective weight ratio of styrene to acrylonitrile in the second copolymer and also in the graft copolymer superstrate ranges from about 75:25 to 50:50. The preferred second composition has an initial temperature of from about 25 to 100° C.

When the present invention is practiced with the admixing and the placing being conducted sequentially, the admixing is conducted under autogeneous pressures within a total time of less than about five minutes. Similarly, when the admixing and the placing are conducted generally simultaneously, the admixing is substantially complete before more than about ½ the total volatile components present in the first and the second compositions have been removed in the said zone. The process of this invention is preferably practiced continuously.

It is greatly preferred in the practice of this invention to add antioxidant in with the first and the second composition at the time such are exposed to devolatilization.

DRAWINGS

The present invention is better understood by reference to the accompanying drawing wherein:

FIG. 1 is a simplified flow diagram illustrating the practice of the present invention;

FIG. 2 illustrates one type of mixing apparatus usable when practicing one mode of the present invention, the view shown being a side elevational one with some parts being shown in partial section;

FIG. 3 illustrates one type of devolatilizer apparatus usuable when practicing one mode of the present invention, the view shown being a side elevational one with some parts being shown in partial section; and FIG. 4 is a flow diagram illustrating one presently preferred example of practicing the present invention.

PREFERRED EMBODIMENTS

The first composition described above in a product produced by the process of the present invention becomes a matrix phase while the second composition becomes a dispersed phase in such product, at least as respects the graft copolymer portion thereof. The products of the process of the present invention consist largely of polymers of monovinylidene aromatic monomer and alkene nitrile monomer, and such monomers in polymeric form comprise at least about 50 percent by weight and preferably at least about 75 percent by weight of products produced by the process of this invention. Most preferably such monomers comprise at least about 90 percent by weight thereof. Commercial compositions may have incorporated thereinto minor amounts, that is, less than about 5 weight percent on a total weight basis, of other components, such as chain transfer agents, modifiers and the like.

Those skilled in the art will appreciate that the composition of a matrix phase preferably approximates the chemical composition of the superstrate of the graft copolymer, so as to enhance matching of the chemical properties of matrix with graft copolymer. In addition, there may be increased bonding between the superstrate of the graft copolymer and the matrix phase when such chemical compositions are so approximated. It will be appreciated, however, that deviations in the composition of, respectively, the matrix and the graft copolymer superstrate may be desirable for some applications and that some deviations may inherently occur as a result of the process variables.

Exemplary of the monovinylidene aromatic monomers which may be used in the products produced by the processes of the present invention are styrene, alpha-alkyl monovinylidene monoaromatic compounds, such as alpha-methyl styrene, alpha-ethyl styrene, alpha-methyl vinyl toluene, alpha-methyl dialkyl styrenes, and the like; ring substituted alkyl styrenes, such as vinyl toluene, ortho-ethyl styrene, para-ethyl styrene, 2,4-dimethyl styrene, and the like; ring substituted halo styrenes, such as o-chlorostyrene, p-chlorostyrene, o-bromostyrene, 2,4-dichlorostyrene, and the like; ring alkyl, ring halo substituted styrenes, such as 2-chloro-4-methyl styrene, vinyl anthracene, and the like. The alkyl substituents generally have one through four carbon atoms and can include isopropyl and isobutyl groups. If so desired, mixtures of such monovinylidene aromatic monomers may be employed.

Exemplary of the alkene nitrile monomers which may be used in the products produced by the processes of the present invention are acrylonitrile, methacrylonitrile, ethacrylonitrile, and mixtures thereof.

Examples of other monomers which can be used in the minor amounts above indicated with the monovinylidene aromatic monomer and the alkene nitrile monomer are conjugated 1,3-dienes, such as butadiene, isoprene, and the like; alpha- or beta-unsaturated monobasic acids or derivatives thereof, such as acrylic acid, methacrylate, ethylacrylate, butylacrylate, 2-ethylhexylacrylate, methacrylic acid and the corresponding esters thereof; acrylamide, methacrylamide, and the like; vinylidene chloride, vinylidene bromide, and the like; vinyl esters such as vinyl acetate, vinyl propionate, and the like; dialkyl maleates or fumarates such as dimethyl maleate, diethyl maleate, dibutyl maleate, the corresponding fumarates, and the like. As those skilled in the art will appreciate, the amount of such comonomers which may be included in a product produced by a process of the present invention will vary as the result of many factors.

THE FIRST COMPOSITION

Those skilled in the art will appreciate that a first composition, as described above, may be prepared by any conventional means known to those skilled in the art. A preferred first composition comprises styrene and acrylonitrile.

A greatly preferred method of preparing a first composition for use in the practice of the present invention involves the mass polymerization under continuous conditions of monovinylidene aromatic monomer with alkenenitrile monomer to produce directly a first composition. Such polymerization processes are well known.

Any conventional mass polymerization technique for copolymerizing monovinylidene aromatic monomers and alkene nitrile monomers may be employed. Preferably, a given such product copolymer for use as a starting material in the practice of the present invention has a weight average molecular weight ranging from about 75,000 to 250,000, a dispersion index from about 2.0 to 3.5, a substantially constant molecular weight distribution, and a substantially constant composition distribution.

As those skilled in the art will appreciate, there can be a wide range of weight ratios of monovinylidene aromatic monomer to alkene nitrile monomer within first compositions, and/or within the respective weight ratios of such copolymers and unpolymerized monomers comprising a given first composition. Thus, if one uses a hot melt from a continuous mass polymerization zone, there will always be a variation between such ratios in the copolymer and in the monomer mixture, except at the monomer/copolymer azeotrope because the instantaneous monomer and copolymer compositions are not the same. At the monomer/copolymer azeotrope, the system is composed approximately of 25 weight percent acrylonitrile and 75 weight percent styrene. When the concentration of acrylonitrile in the monomer composition is below that existing at the azeotrope, the respective compositions of reacting monomer mixture and of resultant instantaneously formed copolymer product both tend to go down in acrylonitrile content as conversion increases but at different relative rates. On the other hand, when the amount of acrylonitrile present in a monomer composition is greater than that existing at the azeotrope, the weight percentage of acrylonitrile in monomer composition as well as that incorporated into the resulting instantaneously formed copolymer product both tend to rise as polymerization proceeds, but at different respective rates. As a consequence, except at the azeotrope, when one desires to select and maintain a particular styrene/acrylonitrile monomer composition in which the amount of acrylonitrile present is greater or less than the amount of acrylonitrile desired to be present in the copolymer being polymerized, one must continuously feed into and mix into, the polymerizing mass fresh monomers at controlled ratios of one monomer to the other and at controlled rates. In other words, the composition of the monomer composition of the polymerizing mass must be carefully regulated in order to produce a copolymer product having a narrow composition distribution. Maintenance of constant composition aids in controlling molecular weight distribution, which is primarily dependent upon temperature and chain transfer agent concentration, and, to a lesser extent, upon conversion in continuous mass polymerization.

One can prepare a first composition by blending together preformed such copolymers and such monomers in any desired proportion from whatever source; a first composition prepared by mass polymerization is not necessary. Further, one can add materials to a mass polymerized first composition, such as added copolymer or monomer, before use in practice of the present invention. A first composition should, however, at the time of use in the practice of this invention, be in the form of a homogeneous hot melt, as indicated.

THE SECOND COMPOSITION

A second composition, as described above, may be prepared by any conventional means known to those skilled in the art. However, for purposes of the practice of the present invention, it is convenient to produce a second composition by polymerizing the superstrate monomers in the presence of a preformed rubber substrate preferably under emulsion conditions. In such a graft polymer system, it is generally not possible to extract ungrafted rubber from the polymerized (grafted) rubber with the usual rubber solvents, with the amount of ungrafted rubber polymer being very small, i.e. less than 2 percent, and preferably less than 0.5 percent, by weight based on total graft copolymer weight. Also, since 100 percent grafting efficiency of superstrate monomers to rubber substrate normally is approached only at weight ratios of monomers to substrate of below about 0.3:1, at least a portion of the monomers polymerized in the presence of the preformed rubber substrate will not chemically combine therewith so as to provide a graft copolymer product. This noncombined copolymer superstrate portion may be increased or decreased depending upon the ratio of monomers to rubber, the particular monomer starting formulation, the nature of the rubber, the conditions of polymerization and the like, as those skilled in the art appreciate. Hence, a second composition typically contains some amount of a second (ungrafted) copolymer of monovinylidene aromatic monomer and alkene nitrile monomer by reason of available methods of making a graft copolymer for use in the practice of the present invention. In general, any of the known graft polymerization processes may be used to accomplish graft polymerization of the superstrate monomers to the preformed elastomer alkadiene substrate. Such techniques are generally well known to those skilled in the art.

Various alkadiene rubbers may be employed as a substrate, including conjugated 1,3-diene rubbers, ethylene-propylene-diene terpolymer rubbers, acrylate-diene copolymer rubbers, and mixtures thereof. It is now preferred to inculde at least about 40 weight percent of a conjugated alkadiene component in an elastomer used to make starting compositions for use in this invention.

Preferred substrate rubbers are alkadiene rubbers or mixtures of alkadiene rubbers composed of at least 75 weight percent based on total rubber alkadiene monomers, such as rubbery polymers having a second order transition temperature not higher than about 0° C., and preferably not higher than about −20° C., as determined, for example, by ASTM test number D–746–52T, examples of such conjugated 1,3-dienes including butadiene, isoprene, piperylene, chloroprene, and the like. Such rubbers include homopolymers of conjugated 1,3-dienes and interpolymers of such 1,3-dienes with up to an equal amount by weight of one or more copolymerizable monoethylenically unsaturated monomers, for example monovinylidene aromatic hydrocarbons such as styrene, and aralkyl styrenes, such as the o-, m-, and p-methyl-styrenes, 2,4-dimethyl styrene, and the arethyl styrenes, p-tertbutyl styrene, and the like; and alpha-alkyl-styrenes, such as alpha-methyl styrene, alpha-ethyl styrene, alpha-methyl-p-methyl styrene, etc.; vinyl naphthalene etc.; ar-halo monovinylidene aromatic hydrocarbons, such as the o-, m-, p-chlorostyrenes, 2,4-dibromostyrene, 2-methyl-4-chlorostyrene, etc.; acrylonitrile; methacrylonitrile; alkyl acrylates, such as methylacrylate, butylacrylate, 2-ethylhexyl acrylate, etc., and the corresponding alkyl methacrylates; acrylamides, such as acrylamide, methacrylamide, n-butylacrylamide, etc.; unsaturated ketones, such as vinyl methyl ketone, methyl isopropenyl ketone, etc.; alphaolefins such as ethylene, propylene, etc.; pyridines; vinyl esters, such as vinyl acetate, vinyl stearate, etc., vinyl and vinylidene halides, such as the vinyl and vinylidene chlorides and bromides, etc.; and the like.

Although the rubber may contain up to about 2 percent of a cross-linking agent based on the weight of the rubber-forming monomer or monomers, excessive cross-linking can result in loss of the rubbery characteristics. The cross linking agent can be any of the agents conventionally employed for cross-linking diene rubbers, e.g., divinyl benzene, diallyl maleate, diallyl fumarate, diallyl adipate, allyl acrylate, allyl methacrylate, diacrylates, and dimethacrylates of polyhydric alcohols, e.g., ethylene glycol dimethacrylate, etc.

A preferred group of rubbers are those consisting essentially of from about 75 to 100 percent by weight of alkadiene monomers and from 0 to 25 percent by weight of a monomer selected from the group consisting of monovinylidene aromatic hydrocarbons, e.g., styrene and unsaturated nitriles, e.g., acrylonitrile, or mixtures thereof. Particularly advantageous rubber substrates are butadiene homopolymer or a copolymer of 90 to 95 percent by weight butadiene and 5 to 10 weight percent of acrylonitrile or styrene.

Of the various techniques customarily employed for the polymerizing of rubber monomers, including mass, suspension, and emulsion polymerization, emulsion polymerization is preferred since such will provide a particle size distribution which is preferred for use in the present invention. Furthermore, emulsion polymerization of rubber monomers produces a latex which is useful as a base or starting point for subsequent emulsion polymerization of the superstrate monomers onto the preformed rubber in the preparation of a second composition.

The graft copolymers of a second composition may be prepared by polymerizing superstrate monomers in the presence of the preformed rubber substrate, generally in accordance with conventional graft polymerization techniques. Although suspension and mass polymerization techniques may be employed, the preferred processes use an emulsion technique to obtain the particle size of not more than about 0.8 microns for the graft copolymer which is preferred for use in the practice of the present invention. In such graft polymerization, a preformed rubber substrate generally is dissolved or dispersed in the monomers, and this admixture is polymerized to combine chemically or graft a portion of the superstrate monomers upon the rubber substrate. Depending upon the ratio of monomers to rubber substrate and polymerization conditions, it is possible to regulate both the desired degree of grafting of the superstrate monomers onto the rubber substrate and the polymerization of ungrafted matrix copolymer. The ratio of monomers to rubber charged to the graft polymerization reaction zone is a primary determinant of the superstrate:substrate ratio of the resultant graft copolymer, although conditions of polymerization, rubber chemistry and particle size, rates of monomer addition, chain transfer agents, etc., may also exert an effect.

A polymerization catalyst is generally included and the amount used is generally within the range of from about 0.001 to 3.0 weight percent, and preferably from about 0.005 to 0.5 weight percent of the total polymerizable material, the exact amount depending upon the monomers and the desired polymerization cycle.

As is well known, it is often desirable to incorporate molecular weight regulators such as mercaptans, halides and terpenes in relatively small percentages by weight, on the order of from about 0.001 to 2.5 percent by weight of the polymerizable material. In addition, it may be desirable to include relatively small amounts of antioxidants or stabilizers, such as the conventional alkylated phenols and the like, although these may be added during or after polymerization.

In the emulsion polymerization grafting process, the monomers and rubber substrate are emulsified in water by use of suitable emulsifying agents, such as fatty acid soaps, alkali metal or ammonium soaps of high molecular weight, alkali or alkaryl sulfates and sulfonates, mineral acid salts of long chain aliphatic amines, etc. Emulsifying agents which have proven particularly advantageous are ammonium oleate, sodium palmitate, sodium stearate, and other sodium soaps. Generally, the emulsifying agent is provided in amounts of from about 0.1 to 15 parts by weight per 100 parts by weight of the monomers, and water is provided in an amount of from about 1 to 4 parts per part of monomers, and even in larger ratios where greater dilution is desirable, all as those skilled in the art appreciate.

If desired, an aqueous latex formed in the emulsion polymerization of the rubber substrate may provide the aqueous medium onto which the monomers are grafted, with or without the addition of further emulsifying agents, water, and the like. However, the rubber may be dissolved in the monomers, and the mixture emulsified, or a latex thereof may be separately prepared. Various water soluble free radical polymerization initiators are conventionally used for emulsion polymerization of the rubber monomer, including conventional peroxy- and azo-catalysts, and the resulting latex may be used as the aqueous medium in which the graft copolymer monomers are admixed. In this manner, the catalyst for the rubber polymerization may function in whole or part as the catalyst for the graft polymerization. However, additional catalysts may be added at the time of graft polymerization.

Typical emulsion polymerization conditions involve temperatures in the range of from about 20 to 100° C. with agitation, and preferably an inert atmosphere. Pressures of from about 1 to 100 pounds per square inch may be employed, and monomers and/or additional catalysts may be added incrementally or continuously over a portion of the reaction cycle. Polymerization is preferably continued until substantially all, that is more than 90 percent, of the monomers have polymerized. The remaining monomers and other volatile components are then distilled away from the latex, preferably, which is then de-watered, washed and dried.

Particle size of the emulsion latex graft particles may be varied by seeding, emulsifying agent concentration, agitation, rubber size variation through agglomeration prior to grafting, coagulation techniques, etc. Preferred agglomeration procedures are provided by Dalton's U.S. Pat. 3,558,541 and U.S. Pat. 3,551,370.

The particle size of the rubber has an effect upon the optimum grafting level for a graft copolymer. For example, a given weight percentage of smaller size rubber particles will provide considerably higher surface area for grafting than the equivalent weight of a larger size rubber particle. Accordingly, the density of grafting can be varied depending upon the size of the rubber particle. Generally, the smaller graft polymer particles will tolerate a higher superstrate/substrate ratio than the larger size particles.

The particle size of the rubber graft copolymer has a significant effect upon the gloss and physical properties of the product produced by the processes of this invention. Typically, the particle size of the graft copolymers used in the practice of the present invention may be varied from as little as about 0.25 microns to as much as about 2.0 microns, depending upon the ultimate properties desired for a given product. A preferred second composition for use in the practice of this invention contains graft copolymers having a weight average particle size of from about 0.3 to 0.8 microns, and more preferably from about 0.3 to 0.6 microns.

For purposes of determining weight average particle size, one can prepare a dispersion of the graft copolymer particles and make a photomicrograph thereof. The size of approximately 200 to 1,000 particles is then measured and an average taken thereof, so as to obtain the average particle size based upon a number average or a weight average. Alternatively, other techniques of measurement may be employed, including light scattering techniques, so long as a reasonably close relationship is established between actual size and the technique employed.

Although a starting rubber may be cross-linked, this may present problems from the standpoint of dissolving or dispersing the rubber for a suspension polymerization processs. However, for emulsion polymerization processes, the rubber desirably has a significant degree of cross-linking. With respect to the graft copolymers, however, at least some degree of cross-linking is inherent during the graft polymerization processs, and this desirably may be augmented through the addition of cross-linking agents or control of the polymerization conditions.

To prepare a second composition, it is preferred as a first step to mix from about 15 to 99 parts by weight, in terms of solid content, of an alkadiene type rubbery polymer latex, with correspondingly, from about 1 to 85 parts of weight of at least one monomer of the monovinylidene aromatic type or the alkene nitrile type, which is graft polymerizable on said rubbery polymer. And then the resulting mixture is subjected to an emulsion graft polymerization.

After such emulsion graft polymerization the resulting graft polymer is extracted or removed from the graft polymer latex, and water is substantially separated therefrom. The graft polymer following formation may be removed from the latex and transferred to an organic liquid phase by any conventional means. The organic liquid used as the continuous phase in such dispersion is as generally characterized above. That is, such organic liquid should have a boiling point of from about 25 to 150° C. at atmospheric pressure, be chemically unreactive with the graft copolymer and swell the graft copolymer not more than 25 percent by volume. So long as the material has these characteristics, any organic liquid can be used.

Examples of typical organic liquids of the non-polymerizable type include: ketones, such as acetone; and aldehydes, such as acetaldehyde, and the like; nitriles, such as acetonitrile, etc. and mixtures thereof. Preferred liquids contain polar groups.

A preferred class of organic liquids comprises monomers having one double bond, and more preferably monomers of the monovinylidene aromatic type, such as styrene, alpha-methyl styrene or vinyl toluene, or the alkene nitrile type, such as acrylonitrile, methacrylonitrile, etc. or mixtures of such monomers. It is preferred further that such unsaturated monomer or monomers have a high degree of compatibility with the graft copolymer particles.

For a preferred phase transfer process, a temperature in the range of from about 0° C. to room temperature is employed in view of the thermo-polymerization of the unsaturated monomer, the dissolution thereof in water contained in the latex, and the coagulation of the graft copolymer latex itself. In general, the amount of organic liquid added to the graph copolymer latex ranges from about 25 to 60 parts by weight organic liquid per 100 parts by weight latex, or about 70 to 300 parts of such liquid per 100 parts of total latex solids.

It is sometimes desirable to incorpoate a small amount of a coagulant with the organic liquid employed in the phase transfer so that the graph copolymer is completely transferred from the aqueous phase to the organic liquid phase. If a coagulant is used, it is usually preferred to allow the coagulated system to stand or be centrifuged to separate the water, which is then removed. The residual phase is a mixture of the organic liquid and the graft copolymer, in which the graft copolymer particles have been suspended and dispersed molecularly in the organic liquid without being destroyed or agglomerated.

It is typically necessary to separate water liberated from the graft copolymer system during phase transfer. Water removal can be accomplished by any conventional means known to the art, including decanting, centrifuging, filtering and the like.

Various ABS type resins may be produced by the processs of this invention from a starting first composition and second composition. Examples of classes of ABS type resins producible by the teachings of this invention include resins having relatively monodispersed particle size distributions, resins having two particle sizes where one is a small particle high graft component and one is a large particle, resins where there is a graft particle component which is polydisperse in particle size distribution, and the like. In the above cases, the particle size distribution would be such that the weight average particle size ranges from about .25 to about 2.0 microns with the preferred range being from .3 to .8 microns. Also, the rubber graft may be based on a low graft small particle rubber where the low graft particles cluster to form the large particles in the final blend. For example, the product produced may contain rubber particles which are substantially all of this type and, for another example, the product so produced may contain some small particle high graft component admixed with the low graft component.

DESCRIPTION OF DRAWINGS

FIG. 1 illustrates the practice of the present invention in terms of the preparation of an ABS resin. Here, the first composition, above referenced is a styrene/acrylonitrile copolymer, abbreviated SAN in FIG. 1, hot melt and the second composition, see discussion above, is an ABS type crumb dispersion. Here, the organic liquid can be regarded as being acrylonitrile. The first and the second composition are admixed together and then devolatilized. During devoatilization water and monomers are removed as vapor from the polymer composition. After devolatilization the polymer product is further processed typically by extruding either into the form of strands which are then cut into pellets or in the form of an end-use article manufactured directly.

In FIG. 2 is shown one type of mixer assembly which is suitable for admixing a first composition with a second composition in accordance with the teachings of this invention, when the admixing step precedes the devolatilization step. The mixer apparatus shown in FIG. 2 can be of the static mixer (Kenics) type and is herein designated in its entirety by the numeral 10. Within mixer 10, mixing is accomplished in the elongated cylindrical zone 11 by the use of the stationary helical alternating elements 12 and 13 positioned in zone 11 in end-to-end fashion. A first and a second composition to be admixed are input into zone 11 through a Y-joint 14, in the body of mixer 10. Electrical band heaters 15 and 16 maintain the temperature in zone 11 at a predetermined level during the mixing operation. Flow rate through a zone 11 can vary widely, typical flow rates ranging from about 50 to 12,000 pounds per hour, the flow rate for any given such zone 11 of course being dependent upon the particular type and size of equipment being utilized. The output end 17, of mixer 10 conveniently directly interconnects with a devolatilizer.

Figure 4:
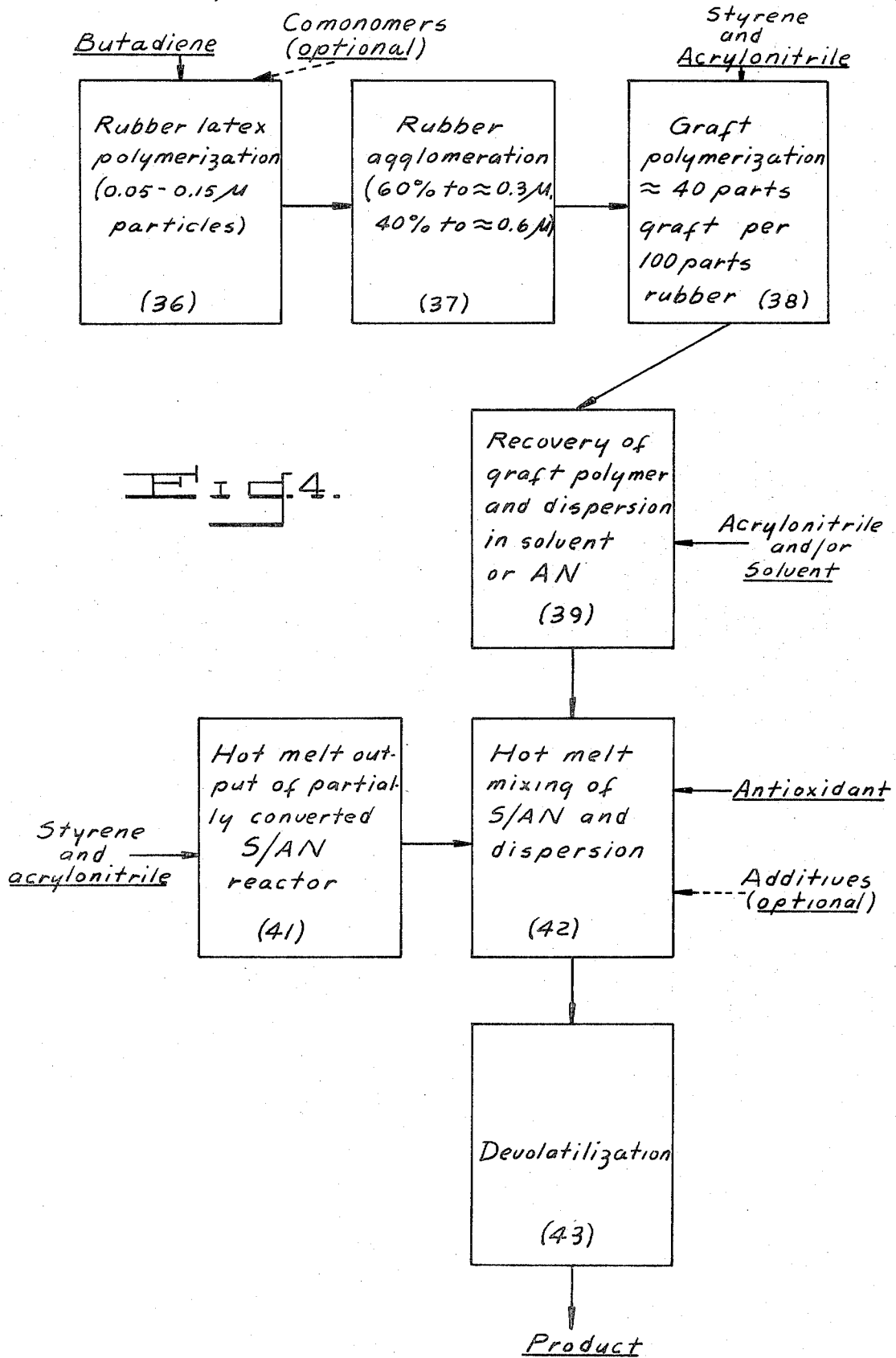

It is a distinct feature of the present invention that, in general, only mild mixing need be utilized to admix a first composition with a second composition as when a mixing step precedes a devolatilization step. A type of mixer as shown in FIG. 2 is generally not required in the practice of this invention, particularly when one is practicing the present invention on a relatively small scale, since a simple T- or Y-type interconnecting pipe arrangement generally produces sufficient intermixing action to produce mixing sufficient to precede devolatilization.

While devolatilization can be accomplished using any conventional devolatilization apparatus, such as a wiped film devolatilizer or a falling strand devolatilizer, it is generally preferred for purposes of the present invention to employ a wiped film devolatilizer. A semi-schematic diagram of a wiped film devolatilizer is depicted in FIG. 3. Into this apparatus, a first and second composition are charged, as through an input pipe 21. On entering the flash vaporization chamber 22, first and second composition are spread in the form of a thin film on the inside wall 23, of devolatilizer 20, by the action of the rotating helical screw members 24, which are secured to central shaft 25, the shaft 25 being end-driven from the lower end thereof by a powerhead (not shown). Walls 23 are jacketed to permit a heat exchange fluid to be used for the maintenance of the walls 23 at some predetermined elevated temperature. During devolatilization in devolatilizer 20, it is preferred that energy be transferred to the mixture undergoing devolatilization primarily by the mechanical action of the screws 24, rather than by heat transfer through the walls 23, although the latter may be used, as those skilled in the art will appreciate. Vapors evolved from material undergoing devolatilization in the chamber 22, are removed therefrom through a vapor exit port 26. After traversing the flash chamber 22, material being devolatilized in a high surface area form enters the compression zone 27, and is generally compressed and brought together into a homogeneous viscous fluid through the action of the screw 28, which is affixed to the shaft 25. After reaching the end (not shown) of compression zone 27 a hot melt from the devolatilizer 20 is removed therefrom by means of a melt pump (not shown). Heat exchange fluid for the jacket about the flashed chamber 22 of devolatilizer 20 is conveniently input through pipe 29 and output through pipe 30. The arrows indicate the direction of material movement in devolatilizer 20 during operation thereof.

Turning to FIG. 4, there is shown a flow sheet illustrating one preferred form in which the present invention may be practiced. Thus, in a first operation 36, a substrate rubber is prepared by conventional emulsion polymerization using butadiene, and, optionally, comonomers. The product rubber latex contains alkadiene rubber in the form of particles ranging from about 0.05 to 0.15 micron.

Then, in a second step 37, the latex of step 36 is agglomerated to produce larger rubber particles where about 60 weight percent thereof have a particle size of about 0.3 micron while about 40 weight percent thereof have a particle size of about 0.6 micron, such percentages being on a 100 weight percent solid rubber basis.

As a third step 38 the agglomerated rubber of step 37 is emulsion polymerized with styrene and acrylonitrile as superstrate monomers to produce a graft copolymer in which there is, in this example, about 40 parts by weight of graft per 100 parts by weight of substrate rubber.

As a fourth step 39, the latex of graft copolymer produced in third step 38, is removed from water phase and dispersed in an organic liquid phase. The organic liquid preferably contains acrylonitrile.

Independently of the preparation of the graft copolymer/organic liquid dispersion, a hot melt of styrene/acrylonitrile copolymer with unpolymerized styrene and acrylonitrile monomers is prepared as in a mass polymerization operation 41. The product of fourth step 39 constitutes a second composition while the product of the mass polymerization operation 41 constitutes a first composition, as these terms are used here and above in reference to the practice of the present invention.

The dispersion of fourth step 39, and the hot melt of mass polymerization step 41, and now admixed together in a mixing step 42, during which an antioxidant is added to the first and second composition. Other additives may also be added at this point if desired.

After the hot mixing step 42, flash vaporization is carried out in a devolatlization step 43, preferably using a wiped film devolatilizer. The product is then conventionally formed into strands quenched and pelletized or directly used for molding or the like. The process of FIG. 4 is preferably conducted continuously.

EXAMPLES

The practice of the present invention is further illustrated by reference to the following specific embodiments wherein all parts are parts by weight unless otherwise indicated.

Examples of *first compositions* suitable for use in the practice of this invention are as follows:

Example A1

Continuously charged with the aid of pumps at a temperature of about 15° C. into the upper half of the reaction zone are liquid monomer streams comprising on a 100 weight percent basis about 70 weight percent styrene at a feed rate of about 7 pounds per hour and about 30 weight percent acrylonitrile at a feed rate of about 3 pounds per hour. The reaction zone is maintain at about a 65 percent volumertic fillage level with a vapor phase thereabove of unreacted monomers. The agitator assembly in the reaction zone is operated so as to maintain in the liquid phase of the reactants in such zone uniform composition distribution.

After start up is completed and substantially steady state continuous mass polymerization operating conditions are reached, the temperature in the reaction zone is maintained at about 155° C. The steady state conversion in the reactor is maintained at about 65 percent. The specific viscosity of the resulting product was about .08. The product is continuously withdrawn from the reaction zone and comprises a hot melt of styrene/acrylonitrile copolymer dissolved in unreacted styrene and acrylonitrile monomers.

Example B1

Continuously charged with the aid of pumps at a temperature of about 15° C. into the upper half of the space of the reaction zone is a liquid monomer stream comprising on a 100 weight percent basis about 70.9 weight percent styrene at a feed rate of 156 pounds per hour and about 29.1 weight percent acrylonitrile at a feed rate of about 64 pounds per hour.

The reaction zone is maintained at about 65 percent volumetric fillage level based on a substantially non-expanded liquid phase with a vapor phase thereabove composed of unreacted monomers. A paddle assembly is rotated about 12 r.p.m. which produces mixing action which maintains in the liquid phase a substantially uniform composition distribution.

After start up is completed and substantially steady state operating conditions are reached, the temperature in the reaction zone is maintained at about 140° C. with the pressure therein being about 35 p.s.i.g. The jacket about the reaction zone is fluid filled and the fluid therein is maintained by heat exchange circulation at about 85° C.

A vaporized monomer composition at steady state conditions is continuously withdrawn at a total rate of about 20 pounds per hour from the vapor phase of the reaction zone at a rate sufficient to maintain the temperature in the reaction zone under substantially isothermal conditions at about 140° C., as indicated above. The so-withdrawn monomer composition is collected and condensed but not returned to the reaction zone. Analysis of the condensate shows it to comprise about 30 weight percent styrene and about 70 weight percent acrylonitrile. The composition of the vapor phase is found to be in substantial equilibrium with the composition of the liquid phase.

The liquid phase is continuously removed at steady state conditions from the bottom, central region of the reaction zone with the aid of a pump at a rate of about 200 pounds per hour which is sufficient to maintain the above-specified volume of fluid in the reaction zone. This liquid phase is found by analysis to contain substantially completely dissolved therein about 50 weight percent based on total liquid phase of a styrene/acrylonitrile copolymer with the balance up to 100 weight percent thereof comprising a mixture of unreacted styrene and unreacted acrylonitrile monomers. The copolymer comprises about 75 weight percent styrene and about 25 weight percent acrylonitrile and has a weight average molecular weight of about 360,000, a dispersion index of about 2.9. This copolymer has a substantially constant molecular weight distribution and a substantially constant composition distribution. This copolymer is substantially without haze and is pale yellow in appearance. The unreacted monomer composition comprises about 75 weight percent styrene and about 25 weight percent acrylonitrile. The rate of liquid phase removal from the reaction zone is about 200 pounds per hour. The viscosity of the liquid phase is estimated to be about 45,000 centipoises at 140° C. and at 10 sec.$^{-1}$. The rate at which this copolymer is formed from the monomer composition is about 0.46 pounds of copolymer per pound of liquid phase per hour.

At these steady state conditions, about 11.8 percent of the heat of reaction is removed from the reaction zone by the removal of the vapor from the vapor phase, about 61.4 percent of the heat of reaction is absorbed by the monomer being charged, and about 26.8 percent of the heat of reaction is removed by heat exchange through the wall of the reaction zone.

Examples of *second compositions* suitable for use in the practice of this invention are as follows:

Example A2

Two fractions of a rubber latex of particles of about .05 micron particle size which comprise about 95 percent butadiene and 5 percent acrylonitrile on a 100 weight percent basis are separated. One fraction is agglomerated to particles of about .28 microns and the other fraction is agglomerated to particles of about 0.68 microns by the addition of acetic anhydride to each fraction. These agglomerated lattices were each stabilized by the addition of a stabilizer (Dowfax 2A1) at about 1 percent based on total latex. The two lattices are combined at a ratio of about 40 percent large particles to 60 percent small particles. The combined system is then grafted in emulsion at 80° C. with 40 parts of graft monomer per 100 parts rubber substrate. The graft monomer composition is 70 weight percent styrene and 30 weight percent acrylonitrile, on a 100 weight percent monomer basis. Water is added prior to grafting to yield a 35 percent solids level graft latex. An emulsified antioxidant is added to the product graft latex, and then coagulation with magnesium sulfate, washing, and drying is carried out, the drying being conducted at 60° C. for approximately 12 hours. This dried crumb is dispersed in acrylonitrile monomer at a 35 percent solids level by the use of high shear pumping action at about 6,000 p.s.i.g. provided by a Manton Gaulin pump.

Example B2

200 parts of the graft copolymer prepared in Part A and 456 parts of the graft copolymer prepared in Part B, all of Example 1 of Aubrey and Jastrzebski U.S. Pat. 3,509,238 (col. 9, lines 10–59) are admixed together as a dispersion in acrylonitrile monomer at a 35 percent solids level by the use of high shear pumping action at about 6,000 p.s.i.g. provided by a Manton Gaulin pump.

Using the foregoing first compositions and second compositions, the following examples illustrate the practice of the present invention:

Example I

The product of Example A1 is continuously admixed with the product of Example A2 at the rate of about 10 lbs. per hour of the Example A1 composition with about 3 lbs. per hour of the product of Example A2. Mixing occurs at a T-joint in converging tubes carrying each such starting composition, and pressures generated in the region of such joint are maintained at autogenous values without adjustment. The mixing rate here used is chosen so that, following the devolatilization step hereinbelow described, there is produced a product ABS resin containing about 10 weight percent rubber based on total ABS product weight.

The resultant mixture is conducted to a wiped film devolatilizer of a type adapted to primarily transfer energy mechanically from the revolving screw thereof to the thin film of material being devolatilized as opposed to energy transfer thermally through devolatilizer walls. The walls of the flash vaporization section, or separation section, of the devolatilizer interior are maintained at the material input port at about 232° C. and at the material output port at about 215° C. The melt material mixture is input at a temperature of about 122° C. The pressure in the flash vaporization section is maintained at about 700 mm. Hg abs. and vapors evolved are continuously removed. Hot melt remaining at the end of the flash vaporization section is compressed and pumped out from the devolatilizer at a pressure of about 1000 p.s.i.g. and at a temperature of about 232° C. Residence time for melt in the devolatilizer is about 1 minute. Clearance between screw lands and separation chamber wall is about 0.01 in.

The vapors evolved may be condensed after separation. The vapors comprise water, styrene monomer, acrylonitrile monomer and some oligomers primarily.

The hot melt from the devolatilizer is fed to a stranding die and formed into strands. The strands are quenched in water and cut up into pellets to produce an ABS-resin product. The pellets are molded into test pieces, e.g. tensile bars, Izod bars ½″ by ½″, and gloss chips 0.1″ thick, using temperatures ranging from about 200 to 260° C. and the property profile reported in Table I below is determined.

Example II

The procedure of Example I is repeated except that initially the product of Example A1 is continuously admixed with the product of Example A2 at the rate of about 10 pounds per hour of A1 product and about 4.9 pounds per hour of A2 product. The mixing rate here used is chosen so that, following the devolatilization step hereinbelow described, there is produced a product ABS resin containing about 15 weight percent rubber based on total ABS product weight. The resultant mixture is conducted to the wiped film devolatilizer of Example I and devolatilized using the same conditions as reported in Example I. The product hot melt is similarly processed and the property profile reported in Table I below is determined:

TABLE I

| | Example | |
|---|---|---|
| | I | II |
| | 10% rubber | 15% rubber |
| Properties: | | |
| Matrix (specific viscosity) | .080 | .080 |
| Percent residual monomer | .15 | .24 |
| Izod impact strength, ft. lbs./inch notch. | 1.1 | 3.9 |
| Percent shrinkage | 26.1 | 21.8 |
| Gloss | 93 | 92 |
| Tensile (yield), p.s.i. | 8,950 | 7,750 |
| Elong. at fail, percent. | 17 | 18.3 |
| Modulus, p.s.i. | $4.37 \times 10^5$ | $3.61 \times 10$ |

The properties reported in Table I show that the process of this invention as here practiced produces ABS resins suitable for commercial utilization if desired.

Example III

The product of Example B1 is continuously admixed with the product of Example B2 using the same conditions as in Example I and is thereafter devolatilized by the conditions of Example I. An excellent resin product is produced.

What is claimed is:

1. In a process for the manufacture of resins of the type where rubber particles of alkadiene rubber grafted with monovinylidene aromatic monomer and alkene nitrile monomer are generally uniformly dispersed in a matrix of copolymer of monovinylidene aromatic monomer and alkene nitrile monomer, the improvement which comprises the steps of:
   (A) admixing together, while maintaining a temperature of from about 120 to 180° C. on a 100 weight percent total mixture basis
      (1) from about 50 to 90 weight percent of a first composition comprising from about 40 to 80 weight percent on a total first composition basis of a first copolymer of monovinylidene aromatic monomer/alkene nitrile monomer having a weight average molecular weight from about 75,000 to 500,000 with the balance up to 100 weight percent thereof being monomers selected from the group consisting of monovinylidene aromatic monomer and alkene nitrile monomer, the respective weight ratio of monovinylidene aromatic monomer to alkene nitrile monomer in said first copolymer and also in said monomers ranging from about 90:10 to 10:90, said first composition being initially in the physical form of a homogeneous hot melt and having an initial temperature of from about 130 to 180° C.
      (2) from about 50 to 10 weight percent of a second composition comprising from about 30 to 70 weight percent on a total second composition basis of graft copolymer, from about 0.01 to 50 weight percent of a second copolymer of monovinylidene aromatic monomer/alkalene nitrile monomer having a weight average molecular weight of from about 50,000 to 500,000, from about 70 to 30 weight percent of an organic liquid having a boiling point in the range of from about 25 to 150° C. at atmospheric pressure and further being characterized by being substantially non-chemically reactive with said graft copolymer and by causing said graft copolymer to swell by not more than about 25 percent by volume, and from about 0 to 15 weight percent of water, said graft copolymer having a substrate of an alkadiene elastomer whose glass phase transition temperature is below about −20° C., a superstrate of a copolymer of monovinylidene aromatic monomer and alkene nitrile monomer, a graft ratio of from about 5 to 75 parts by weight superstrate for each 100 parts by weight of substrate, and a weight average particle size in the range of from about 0.25 to 2.0 microns, the respective weight ratio of monovinylidene aromatic monomer to alkene nitrile monomer in said second copolymer and also in said graft copolymer superstrate ranging from about 90:10 to 10:90, said second composition being initially in the physical form of a dispersion of said graft copolymer in said organic liquid and having an initial temperature ranging from about 0° C. up to the boiling point of said organic liquid, and
   (B) placing the so-admixed said first composition and said second composition in a flash vaporization zone for a time of less than about 10 minutes, said flash vaporization zone being at a temperature of from about 120 to 280° C. and at a pressure of from about 0.001 to 800 mm. Hg abs. while maintaining such admixture in a physical form such that, for a period of time of at least about 1 minute in said zone, such admixture has a ratio of total surface area to total volume thereof at any given time of at least about 2.5:1, and while removing vapors evolved from such admixture in said zone, the combination of such conditions in said zone being such that the devolatilized composition thereafter removed from said zone comprises at least about 97 weight percent on a total devolatilized composition basis of combined said first and said second copolymers of monovinylidene aromatic monomer/alkene nitrile monomer and said graft copolymer.

2. The process of Claim 1 wherein said monovinylidene aromatic monomer comprises styrene.

3. The process of Claim 2 wherein said alkene nitrile comprises acrylonitrile.

4. The process of Claim 3 wherein
   (A) during said admixing, the maintained temperature ranges from about 120 to 180° C., and
      (1) said first composition comprises from about 50 to 90 weight percent of said total mixture while said second composition correspondingly comprises from about 50 to 10 weight percent thereof, said first composition comprising from about 55 to 70 weight percent on a total first composition basis of styrene/acrylonitrile first copolymer having a weight average molecular weight of from about 100,000 to 300,000 with the balance up to 100 weight percent thereof being a mixture of styrene monomer and acrylonitrile monomer, the respective weight ratio of styrene to acrylonitrile in said first copolymer and also in said monomer mixture ranging from about 75:25 to 50:50, said homogeneous hot melt having an initial temperature of from about 140 to 170° C., (2) said second composition comprising from about 50 to 10 weight percent on a total second composition basis of said graft copolymer, from about 0.01 to 25 weight percent of styrene/acrylonitrile second copolymer having a weight average molecular weight of from about 75,000 to 300,000, from about 65 to 40 weight percent of said organic liquid having a boiling point in the range of from about 50 to 100° C., at atmospheric pressure and further being characterized by causing substantially no swelling of said graft copolymer, and from about 0 to 10 weight percent water, said graft copolymer having a substrate of an elastomer comprising at least about 85 weight percent butadiene with the balance up to 100 weight percent thereof being a comonomer selected from the group consisting of styrene and acrylonitrile, a graft ratio of from about 10 to 50 parts by weight superstrate for each 100 parts by weight of substrate, and a weight average particle size in the range from about 0.3 to 0.8 micron, the respective weight ratio of styrene to acrylonitrile in said second copolymer and also in said graft copolymer superstrate ranging about 75:25 to 50:50, said second composition having an initial temperature of from about 25 to 100° C.

5. The process of Claim 1 wherein said admixing and said placing are conducted sequentially and said admixing is conducted under autogeneous pressures within a total time of less than about 5 minutes.

6. The process of Claim 1 wherein said admixing and said placing are conducted generally simultaneously and said admixing is substantially complete before more than about ½ the total volatile components present in said first and in said second composition have been removed in said zone.

7. The process of Claim 1 wherein said admixing and said placing are conducted continuously.

8. The process of Claim 1 wherein an antioxidant is further admixed with said first and said second composition.

9. The process of Claim 7 wherein an antioxidant is further admixed with said first and said second composition.

References Cited
UNITED STATES PATENTS 3,700,622  10/1972  Terenzi _____ 260—33.6 AO
3,449,471  6/1969   Weitzel et al. _____ 260—880

PAUL LIEBERMAN, Primary Examiner
C. J. SECCURO, Assistant Examiner

U.S. Cl. X.R.
260—880 R